(12) United States Patent
Pellizzer et al.

(10) Patent No.: US 11,991,287 B2
(45) Date of Patent: May 21, 2024

(54) USERNAME-LESS AND PASSWORD-LESS ONE-TIME IDENTIFICATION AND AUTHENTICATION CODE METHOD AND SYSTEM

(71) Applicant: Xiid Corporation, Las Vegas, NV (US)

(72) Inventors: Guido Pellizzer, Lovere (IT); Federico Simonetti, San Jose, CA (US)

( * ) Notice: Subject to any disclaimer, the term of this patent is extended or adjusted under 35 U.S.C. 154(b) by 0 days.

(21) Appl. No.: 17/752,467

(22) Filed: May 24, 2022

(65) Prior Publication Data

US 2022/0286289 A1    Sep. 8, 2022

Related U.S. Application Data

(63) Continuation of application No. 16/915,121, filed on Jun. 29, 2020, now Pat. No. 11,374,759, which is a continuation-in-part of application No. 16/665,928, filed on Oct. 28, 2019, now abandoned.

(60) Provisional application No. 62/751,859, filed on Oct. 29, 2018.

(51) Int. Cl.
*H04L 9/32* (2006.01)
*H04L 9/40* (2022.01)

(52) U.S. Cl.
CPC ........ *H04L 9/3228* (2013.01); *H04L 63/0815* (2013.01); *H04L 63/0853* (2013.01)

(58) Field of Classification Search
CPC ............... H04L 9/3228; H04L 63/0815; H04L 63/0853
See application file for complete search history.

(56) References Cited

U.S. PATENT DOCUMENTS

| | | | | |
|---|---|---|---|---|
| 2012/0311322 A1* | 12/2012 | Koyun | ............... | G06Q 20/3674 713/155 |
| 2014/0189831 A1* | 7/2014 | Kemshall | ............. | H04L 9/3234 726/6 |
| 2014/0201536 A1* | 7/2014 | Fiske | ................... | H04L 9/0844 726/18 |
| 2016/0182479 A1* | 6/2016 | Kaplan | .................. | H04L 63/18 726/6 |
| 2019/0228178 A1* | 7/2019 | Sharma | ............... | H04L 63/0853 |
| 2020/0084204 A1* | 3/2020 | Craswell | ............. | H04L 63/0838 |

* cited by examiner

*Primary Examiner* — Viet D Vu (57) ABSTRACT

A method for a user to access resources within a secure network without inputting a username or password is presented and claimed where the method comprises inputting, by the user, login credentials into an authentication service and obtaining from the authentication service at least one secret code; inputting the at least one secret code into an OTCP to initialize the OTCP; generating within the OTCP a one-time code (OTC) utilizing the at least one secret code but not including the user's login credentials or username; supplying, by the user, the OTC to a secure web portal wherein the secure web portal confirms authenticity of the OTC with the authentication service; and the secure web portal supplying access to the user of the secure web portal resources upon receipt of authentication of the user.

14 Claims, 7 Drawing Sheets

610 – OTC converted back from base32 to original binary format

615 – Data is decrypted using OTP function as decryption key

620 - Identify first 6 bytes of converted original binary format

630 – compare 6 bytes from Step 620 with entire user database

640 – identify matching username

650 – check HOTP or TOTP to authenticate user 10

USERNAME-LESS AND PASSWORD-LESS ONE-TIME IDENTIFICATION AND AUTHENTICATION CODE METHOD AND SYSTEM

BACKGROUND

This invention relates to authentication and verification in a computing environment and in particular to one-time identification and authentication codes ("OTC") utilized for authenticating a user. In the context of this document a "user" can refer to a person, a process, a software, a device, and/or an application programming interface (API).

Traditional authentication methods require a user of a computer system to log into an authentication routine of the computer system by first specifying the username of that particular user and do this each time the user logs in. Once the authentication routine has recognized the username as one that is registered with the identity database that is supported by the authentication routine, the authentication routine then requests additional forms of verification. Probably the most common and traditional additional verification form is a password. Essentially anyone who has utilized a modern computer system is familiar with the username/password form of authentication/login.

Another concept related to computing systems, including banking, online purchasing, registration of personal information, etc., that essentially all users of computers recognize is computer hacking, or in other words, circumventing security installed on computing systems in order to obtain, without permission, the information contained behind the security layer.

Password-based authentication discussed above is a weak means of authentication for the purpose of protecting data behind the security layer which is often a combination of protection devices and methods such as a firewall, an authentication procedure, and oftentimes also intrusion detection and prevention tools. Hackers utilize their skills in computers to steal user names and passwords in order to pierce firewalls and other security measures, devices, applications and procedures, and steal information. It is common to hear in the news that corporations/businesses having significant user information have been hacked and personal data is lost to elements seeking to steal personal identities. Once passwords have been obtained for such businesses the hacker can impersonate a user and obtain secured data. Similarly, users will have their computers hacked and passwords stolen putting their identities and financial information at risk. Many schemes are utilized to strengthen passwords but even strong passwords can be hacked.

One solution created by industry to the password hacking problem is One-Time Passwords or OTP. These OTP limit password hacking by requiring a different password for each authentication. OTP is certainly helpful and brings an additional element of security, but OTP's also require a user name before the OTP is utilized. This creates the problem of potentially giving away a user's "claimed identity."

Clearly there is a need to provide a method of user identification using a one-time identification and authentication code, or OTC, that does not require a user to specify either the user's username or password where the OTC changes at each authentication/verification occurrence or the changes are time-based with time windows composed of a variable number of seconds.

SUMMARY

According to at least one embodiment of the present invention, a method for user authentication through a one-time authentication and verification code is provided where a user does not supply the user's username and password each time the user authenticates to access a secure web portal.

Further according to at least one embodiment of the present invention a method for generating a one-time authentication code provides for generating the code utilizing a random, pseudo-random, or otherwise generated code and at least one of HOTP or TOTP where sufficient information to identify the user profile is part of the one-time authentication code used for authentication.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the claimed invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." "Fig" or "FIGs." herein) of which:

DETAILED DESCRIPTION

While some embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

For purposes of this Detailed Description, the following abbreviations shall have the associated meanings as listed below.

OTC—OTC means one-time code and is a code identifying a user that can only be used once or for a certain predetermined amount of time (if HOTP or TOTP respectively). Any attempts to reuse the same code will result in an unsuccessful user verification.

OTCP—OTCP stands for one-time code producer. OTCP is a system or software capable of producing or creating OTCs.

IAS—IAS is an abbreviation for identity and authentication service. IAS is a system or software that provides identification of users, authentication, and other related services. IAS may, but does not necessarily need to, verify users' identities through OTC. IAS may identify users' identities in other ways.

HOTP—HOTP stands for HMAC one-time password where HMAC is a key-hash message authentication code or hash-based message authentication code. HOTP is an event-based OTP (one-time password), is the original OTP algorithm, and relies on two pieces of information. The first information piece is a secret key, called the "seed", which is known only by a token (an object (in software or hardware) that represents the right to perform some operation) and the server that validates submitted OTP codes. The second information piece is a moving factor which, in event-based OTP, is a counter. The counter is stored in the token and on the server. The counter in the token increments when a button on the token is pressed. The counter on the server is incremented only when an OTP is successfully validated. To calculate an OTP, the token feeds the counter into the HMAC algorithm using the token seed as a key. HOTP uses the SHA-1 hash function in the HMAC. This produces a 160-bit value which is then reduced down to six (6) or eight (8) decimal digits displayed by the token. TOTP—The Time-based One-Time Password algorithm (TOTP) is an algorithm that computes a one-time password from a shared secret key and the current time. It has been adopted as Internet Engineering Task Force[1] standard RFC 6238,[1] is the cornerstone of Initiative For Open Authentication (OATH), and is used in a number of two-factor authentication systems. TOTP is an example of a hash-based message authentication code (HMAC). It combines a secret key with the current timestamp using a cryptographic hash function to generate a one-time password. Because network latency and out-of-sync clocks can result in the password recipient having to try a range of possible times to authenticate against, the timestamp typically increases in 30-second intervals, which thus cuts the potential search space.

In a typical TOTP two-factor authentication application using conventional methods, setup proceeds as follows: a user enters username and password into a website or other server, the server generates a secret key which the user enters on to their TOTP application on a smartphone or other device (often by scanning a QR code). To verify that process worked, the user application immediately generates a one-time password to be checked by the server.

On subsequent authentications pursuant to conventional methods, the user enters their username, password and the current one-time password. The server checks the username and password as normal then also runs TOTP to verify the entered one-time password. For this to work, the clocks of the user's device and the server need to be roughly synchronized (the server will typically accept one-time passwords generated from timestamps that differ by ±1 time interval from the client's timestamp).

In addition to the abbreviations above, it is important to understand the concept of a "token." Conventional systems requiring OTP have utilized tokens to generate the codes. For instance, banks have offered code generators called tokens to customers who desire added security in logging into the bank accounts. Similarly, various companies give tokens to employees and agents who must be travelling but still need access to the services supplied behind the company firewall.

Figure 1:
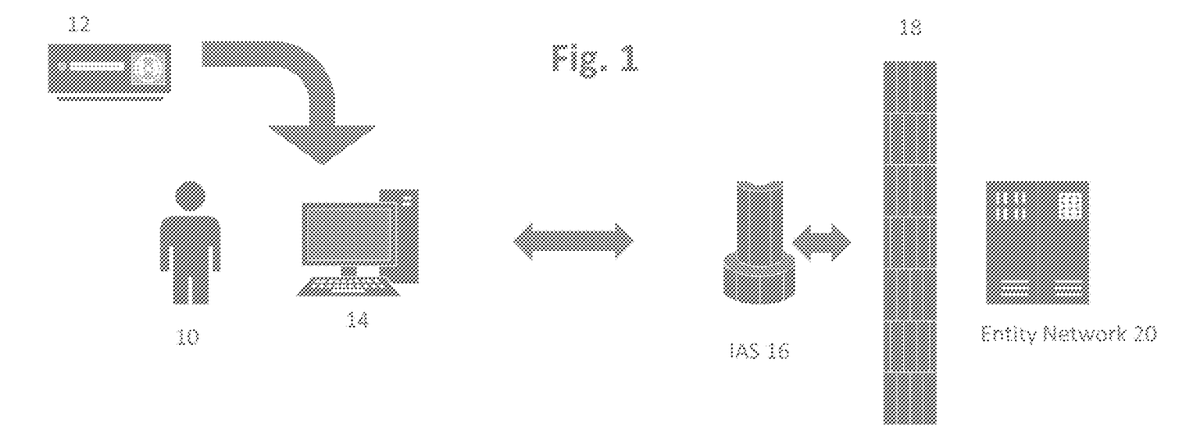
FIG. 1 illustrates an example of a system found in the present state of the art for authentication utilizing tokens and OTC's.

These tokens will utilize the HOTP or TOTP method of generating an OTP. As shown in FIG. 1, a user 10 desiring access to an entity's network 20, such as a bank or company network, will utilize token 12 when attempting to authenticate with IAS 16 which is the internal authentication service for network 20. User 10 will open a communication channel between a computing device 14 and IAS 16 and, in addition to inputting user 10's username and password, will enter the OTP code displayed on token 12 when prompted by the sign-in application for network 20. Generally, the code will be input manually but other means can be employed. Upon determining the proper username and passwords have been submitted along with a timely HOTP or TOTP, IAS 16 will authenticate user 10 for access through the network firewall 18 to access an application or some protected data, and sometimes to access a network, all of which are represented by network 20.

Pursuant to the conventional method described above, each time user 10 authenticates with IAS 16 to access network 20, user 10 must input the associated username and password along with the OTC from token 12. In today's "hacking" environment, with hackers constantly "snooping" and identities and personal information being stolen, frequent use of user 10's username and password increases the chances user 10's login credentials can be compromised.

The present invention, in its various embodiments, removes the need to submit usernames and passwords each time a user 10 desires to log into network 20. In fact, for each token 12, a user 10 logs into the IAS 16 using the user 10's username and password only once during the initial enrollment process. Once initialization has been completed, user 10 no long enters username and password to authenticate with IAS 16. The initialization process will now be further described.

Initialization

Figure 2:
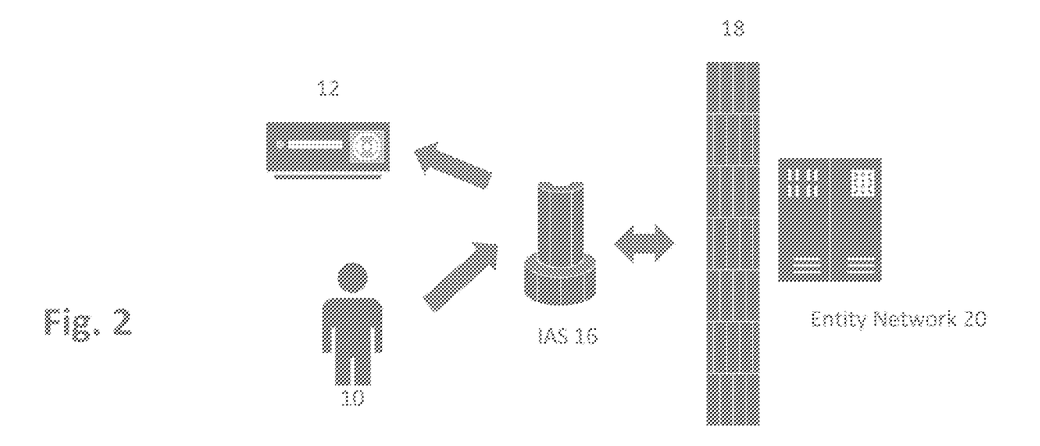
FIG. 2 illustrates an example of a system for initializing an OTCP (One-Time Code Producer as described subsequently) pursuant to a preferred embodiment of the present invention.

As mentioned, pursuant to a preferred embodiment of the present invention, and as shown in FIG. 2, a token 12, which shall be represented as OTCP 100 hereafter, is activated, or in other words initialized, by user 10. In this embodiment, OTCP 100 is a mobile application running on token 12 which may be a phone or tablet or similar mobile electronic device. It should be understood that token 12 is not limited to a phone or tablet, but may be utilized on any computing device, preferably a mobile device but not necessarily so, that runs the OTCP 100 mobile application.

The initiation of OTCP 100, or initialization phase, occurs only once for OTCP 100 running on a single token 12. It should be noted that each separate token 12 running OTCP 100 will be initialized pursuant to the following method. Therefore, if user 10 buys a new phone, upgrades a tablet, or otherwise obtains a new device upon which OTCP 100 operates, user 10 will initialize OTCP 100 on that particular device. The initialization phase takes place in order for OTCP 100 running on token 12 to generate the OTCs.

Figure 3:
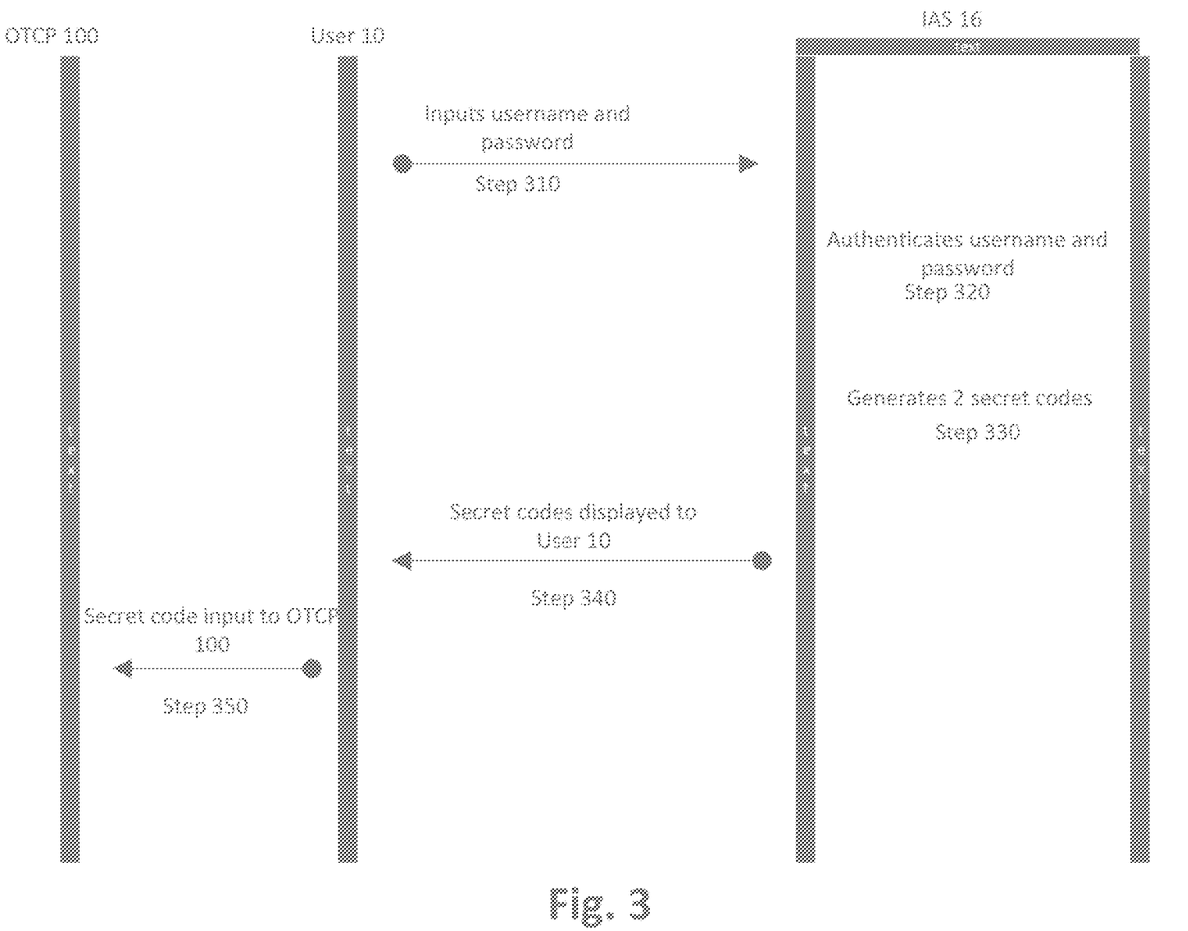
FIG. 3 illustrates a flow diagram for initializing an OTCP pursuant to a preferred embodiment of the present invention.

The method of initializing OTCP 100 is described in reference to FIG. 2 and the step diagram of FIG. 3. Specifically, user 10 inputs user 10's username and password and/or other login credentials to IAS 16 (step 310).

In the preferred embodiment user 10 inputs the username and password from user 10's computing device 14 to IAS 16 directly. Other means may be utilized but such means of inputting should be secure. In step 320, IAS 16 receives the username and password and authenticates these utilizing conventional methods.

The login credentials entered by user 10 into IAS 16 are compared to credentials for user 10 which are stored in IAS 16. If the login credentials (such as username and password) match with the those associated with user 10 then IAS 16 has authenticated the login.

Continuing on with the initialization phase, once the username and password (or other login credentials) have been authenticated, IAS 16 generates at least one secret code. In the preferred embodiment of the present invent five (5) secret codes (step 330) are utilized, but various numbers of secret codes may be utilized pursuant to the present invention.

The five secret codes, according to a preferred embodiment of the present invention, generated by IAS 16 in step 330 are:

a. A secret userLink, totally random for each user;
  b. A secret userSeed, totally random for each user;
  c. A secret groupSeed, totally random and the same for all users who belong to a specific defined group (but distinct and unique for each group).
  d. A secret groupPSK, totally random and the same for all users who belong to a specific defined group (but distinct and unique for each group).
  e. A secret groupShift a numerical value totally random and the same for all users who belong to a specific defined group (but distinct and unique for each group).

These secrets codes are stored on IAS 16, and hereafter will collectively be identified as "secret codes". It is important to note that the userLink code for user 10 does not include user 10's username, password, PIN or other user credentials. Rather, the user 10's credentials are stored in IAS 16 and a random (or other as explained below) number is generated for the userLink code for user 10 which is stored in IAS 16 as being in association with user 10's credentials. Therefore, when IAS 16 receives a communication having user 10's userLink code, IAS 16 can immediately associate such number code (userLink code) with the user 10 credentials stored in IAS 16. In this manner, user 10's username, password, PIN or other user credentials are never transmitted outside of IAS 16. It is noted that the userLink is the only way the IAS 16 will be able, in the future, to recognize which user profile is attempting to authenticate. This userLink may or may not be generated from the user's username, but it always has to be stored together with an association to a specific user profile for the IAS 16 to look up the user profile in the future. This association may be done by storing any other unique user profile information "coupled" with the secret userLink code. Examples of valid associations between secret userLink codes and possible user profiles include:

userLink associated with the username of the user profile
userLink associated with a GUID (globally unique identifier) of the user profile. GUID, or often "UUID" for universal unique identifier, is/are used to identify something with near certainty that the identifier does not identify with one that has been, or will be, created to identify something else.

As just mentioned, these two associations are listed for exemplary purposes but are not all the possible unique value couples. All such unique value couples are contemplated by the present invention.

Five secret codes have been listed above. However, one skilled in the art will recognize that there may be fewer (even only one may be considered but the userLink code must be included to associate the secret code with the user profile) or more. All such numbers of secret codes and combinations are contemplated by the present invention.

Concerning the secret code for "groups," it should be noted that in some or even many instances there may not be an actual group which user 10 belongs to. In this case, IAS 16 will generate a "filler" group secret code and/or groupShift. For purposes of this description of the present invention, the assumption will be that user 10 belongs to a defined group.

The secret codes may be generated as random, pseudo-random or hash algorithms.

At step 340, IAS 16 transmits to user 10's computing device 14 for display, or other type of presentation, the secret codes. At step 350, the secret codes are input into OTCP 100 as outlined below. Note that in the preferred embodiment of the present invention, the secret codes are securely stored and properly encrypted onto the device, in this case token 12, running OTCP 100, although user 10 may or may not encrypt and secure the secret codes depending upon how user 10 manages OTCP 100 and the token 12 device. In a preferred embodiment, the secret codes are protected with biometrics. For instance, a user will need to utilize a scan of the user's finger across a biometric fingerprint reader of token 12 to access the secret codes and cause OTCP 100 to generate OTCs.

Other methods of securing the secret codes are contemplated by the present invention.

Inputting the secret codes into OTCP 100 (step 350) can be done manually, but this method is not convenient and is subject to human error during the input process. In the preferred embodiment, the secret codes, in a preferred embodiment, are store in a QR code and, at step 340, computing device 14 displays the QR code (Quick Response code which is a 2-dimensional/matrix bar code, machine-readable optical label). User 10 then causes OTCP 100, or the token 12 running OTCP 100, to scan the QR code displayed by computing device 14 in step 340. OTCP 100 automatically reads the secret codes contained in the information of the QR code and securely stores, and encrypts, the information in token 12 for future use. Any other means of inputting the QR code into OTCP 100 on token 12 may be utilized in the practice of the present invention.

It should be noted that in the preferred embodiment, the QR code displayed in step 340 and read by the OTCP 100 running on token 12 is encrypted for added security. This is the preferred method but is not necessary to practice the present invention.

As mentioned above, this initiation phase is required only once for each token 12 running OTCP 100. Obviously, if the token 12 and OTCP 100 is erased, or other reasons require the re-installation of OTCP 100 and its accompanying information, then the initiation phase would of necessity need to be redone. Otherwise, user 10 will not need to input user 10's username and/or password or other login credentials again for authentication with IAS 16 when utilizing token 12 running an OTCP 100 that has already been initialized. Each separate device running OTCP 100 is required to complete the one-time initialization phase just described.

Authentication Through OTC

Once user 10 has caused the secret codes generated by IAS 16 to be stored in token 12 running OTCP 100 as explained above, user 10 may authenticate with IAS 16 using OTC's generated by OTCP 100 without inputting user 10's username and password. It should be noted that, as will be explained below with reference to generating the OTC, the userLink code is utilized to generate the OTC. Therefore, the OTC will never include user 10's username, password or other login credentials. The generation and make-up of the OTC generated by OTCP 100 will be described subsequently in the Generating the OTC section.

Figure 4:
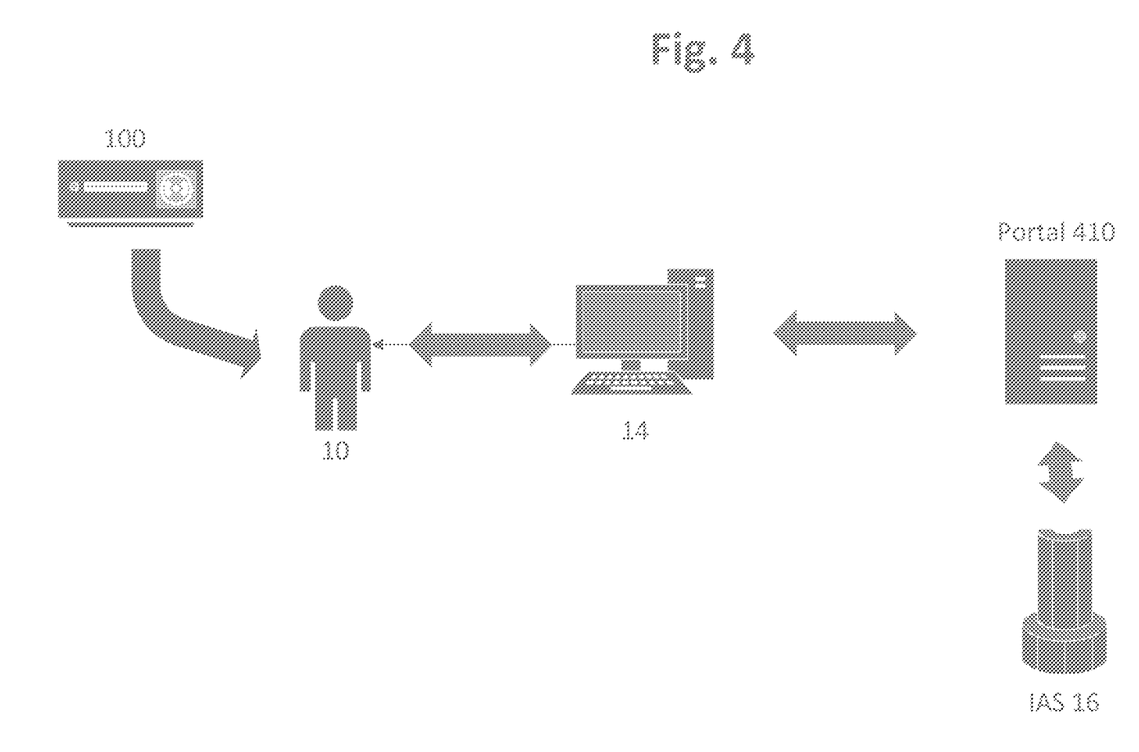
FIG. 4 illustrates an example of a system for logging into a web application utilizing an OTCP pursuant to a preferred embodiment of the present invention.
Figure 5:
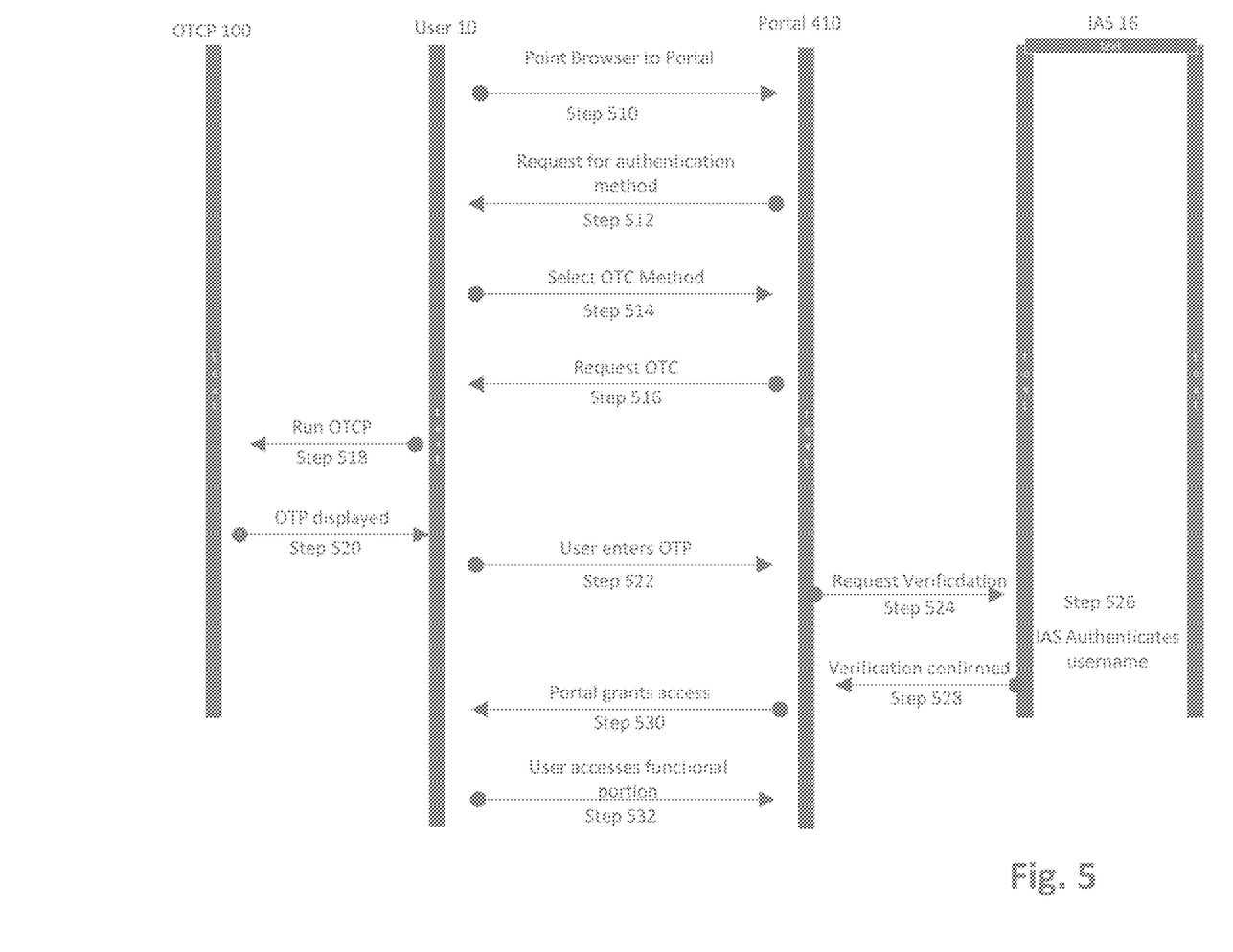
FIG. 5 illustrates a flow diagram for logging into a web application utilizing an OTCP pursuant to a preferred embodiment of the present invention.

Reference is now made to FIG. 4 and the step diagram of FIG. 5.

In FIG. 4, and with reference to the steps of FIG. 5, user 10 is shown authenticating with IAS 16 using an OTC generated by OTCP 100. Specifically, and pursuant to the preferred embodiment of the present invention, user 10 points a client software (typically a web browser running in computing device 14, but this could be any client app/program) to a server application or a web app (server application or web app hereafter referred to as portal 410) (step 510). It is assumed that user 10 requires authentication to access the functional portions of portal 410 such as an application or secure data. If portal 410 has multiple methods of authentication available with one of the methods being OTC pursuant to the present invention, portal 410 will present, through computing device 14, to user 10 the various authentication methods and request selection by user 10 (step 512). User 10 will then request the OTC option (step 514) whereupon portal 410 will request from user 10 an OTC (step 516). If portal 410 only utilizes the OTC method pursuant to the present invention, portal 410 will request from user 10 an OTC (step 516) without supplying options. If portal 410 does not support OTC pursuant to the present invention then user 10 will need to log in through conventional means.

At this point, assuming portal 410 utilizes an OTC method pursuant to the present invention, user 10 will run OTCP 100 on token 12 to generate an OTC (step 518). As outlined above, OTC does not include user 10's login credentials including username, password or PIN. OTCP 100 generates the OTC which is displayed on token 12 (step 520). User 10 then inputs, preferably manually, but other methods may be utilized such as scanning a QR code generated by token 12 where the QR code is generated from the OTC from OTCP 100, the OTC into the web browser which is transmitted to portal 410 (step 522).

Upon receipt by portal 410 of the OTC from user 10, portal 410 transmits a request to IAS 16 requesting verification (step 524). It should be understood that portal 410 will transmit the OTC to IAS 16 as part of the verification request of step 524.

IAS 16 authenticates user 10's request for access to portal 410's functional portion or resources by analyzing the OTC transmitted from portal 410 (step 526). The OTC, as previously outlined, includes the userLink code, thus allowing IAS 16 to associate the OTC with user 10's information stored in IAS 16. Upon authentication by IAS 16 of the OTC, IAS 16 transmits back to portal 410 authorization for user 10 to access portal 410's functional portion (step 528).

Portal 410 then grants access to user 10 (step 530) and in step 532 user 10 accesses portal 410's functional portion.

In the preferred embodiment of the present invention, OTCP 100 runs on a token such as token 12 which is separate from computing device 14. The present invention is not limited to operation of OTCP 100 on a separate token such as token 12. In some embodiments it is possible for OTCP 100 to be loaded on and run on user 10's computing device 14. Although this configuration is possible it is not preferred because the security level decreases substantially when OTCP 100 is loaded on and running on the same computing device.

Generating the OTC

Pursuant to the preferred embodiment of the present invention, a single code, OTC, is generated by the OTCP 100 and contains sufficient information to both identify the user (user 10) without containing the actual username, and verify user 10's identity without containing user 10's password. To help one having ordinary skill in the art of encryption understand how the OTC is generated, an example is given as follows with accompanying assumptions. Although the example gives a preferred embodiment of the assumptions such as base32, sha256, etc., it will be understood that the invention is not limited to these assumptions but can be practiced utilizing a variety of similar assumptions utilizing the general outline and flow of the resultant equation.

Assumptions for the preferred embodiment utilizing the present example:

a. Assume the OTC will be encoded in base32 which is the most legible binary-to-string encoding mechanism and the best at preventing human reading mistakes. Again, other assumptions may be utilized in practicing the present invention.

b. Every possible HOTP/TOTP between 0 and 999,999,999 (every 9-digit OTP) can be encoded in 30 bits (ex. 999,999,999=111011100110101100100111111111).

c. If the OTC is sixteen (16) characters encoded in base32, there will be 80 bits available since 10 bytes (80 bits) encoded in base32 result in a string of 16 characters.

d. Of the 80 bits, 30 bits will be used for the HOTP or TOTP portion of the OTC. There are 50 bits then left to be used to identify user 10.

e. 50 bits=6 characters (48 bits)+2 extra bits that may be ignored or used for parity checks.

f. A "salt" may be utilized with all hashing and/or encryption functions herein. Salt is a common technique in encryption to prevent duplicate results when the same data is encrypted two times, sequentially, with the same key. Encryption Salt has been defined as random data used as additional input to a one-way function that hashes data. One having ordinary skill in the encryption art will recognize "hash" as a function mapping data of arbitrary size to data of a fixed size.

g. The secret codes obtained from IAS 16 are listed in the following equation as "userLink", "userSeed", "userTimeShift" "groupSeed" and "groupPSK" respectively. As mentioned above, the secret codes may be random, pseudo-random, or hash algorithms.

Based upon these assumptions in the example of the preferred embodiment, each OTC will be calculated according to the pseudo-code:

Pseudo-Code 1:
Current is current dateTime 0 counter (TOTP or HOTP); Function Encrypt(data,key)
Returns data encrypted with a key using an encryption algorithm
Function getOTP(seed,dateTime)
Returns OTP code calculated from seed input and dateTime
Function customerOTPlong(seed, current,shift)
Returns a long string to initialize streamXor HOTP/TOTP, which is the stringification of
getOtp(Seed,current)+getOtp(Seed, current+Shift)+getOtp (Seed, current−Shift)
(It should be noted that any OTP-based functions can be used in place of the "getOTP" and "customerOTPlong" functions. The "getOTP" is provided here for exemplary reasons pursuant to a preferred embodiment of the present invention but any OTP-based function is contemplated herein.
Function streamXor(data,encryptedStream)
Return data XORed with encryptedStream
customerOtp:=customerOTPlong(groupSeed,current,groupShift)+groupPSK;
encryptedStream=Encrypt(customerPSK, customerOTP)
UserOtp=getOTP(userSeed,current)
binaryOTC=streamXor(UserOtp+UserLink, customerOTP) OTC=base32(binaryOTC)
As mentioned above, the assumptions, numbers, hash algorithms (or random, pseudo-random) for the secret codes, and 30-bit HOTP and TOTP are preferred embodiments but are not limiting as other assumptions, numbers etc. may be utilized in practicing the present invention. One having ordinary skill in the art will recognize from Pseudo-Code 1 that if any of the "secret codes" is a NULL then the "if/and" operation does not include the NULL "secret code" in the calculation of Equation 1. If any of the "secret codes" does in fact have a value that is not NULL then such "secret code" is included in the calculation of the above method/procedure.

Validation by IAS 16

The following describes the validation or authentication process of the OTC within IAS 16 utilizing the assumptions of the preferred embodiment example discussed above with respect to Generating the OTC. As was clearly explained above, these assumptions are for the preferred embodiment but are not limiting to the practice of the present invention. Other assumptions may be utilized to practice the present invention such as other hash algorithms/random/pseudo-random, other N numbers, other base, etc.

Figure 6:
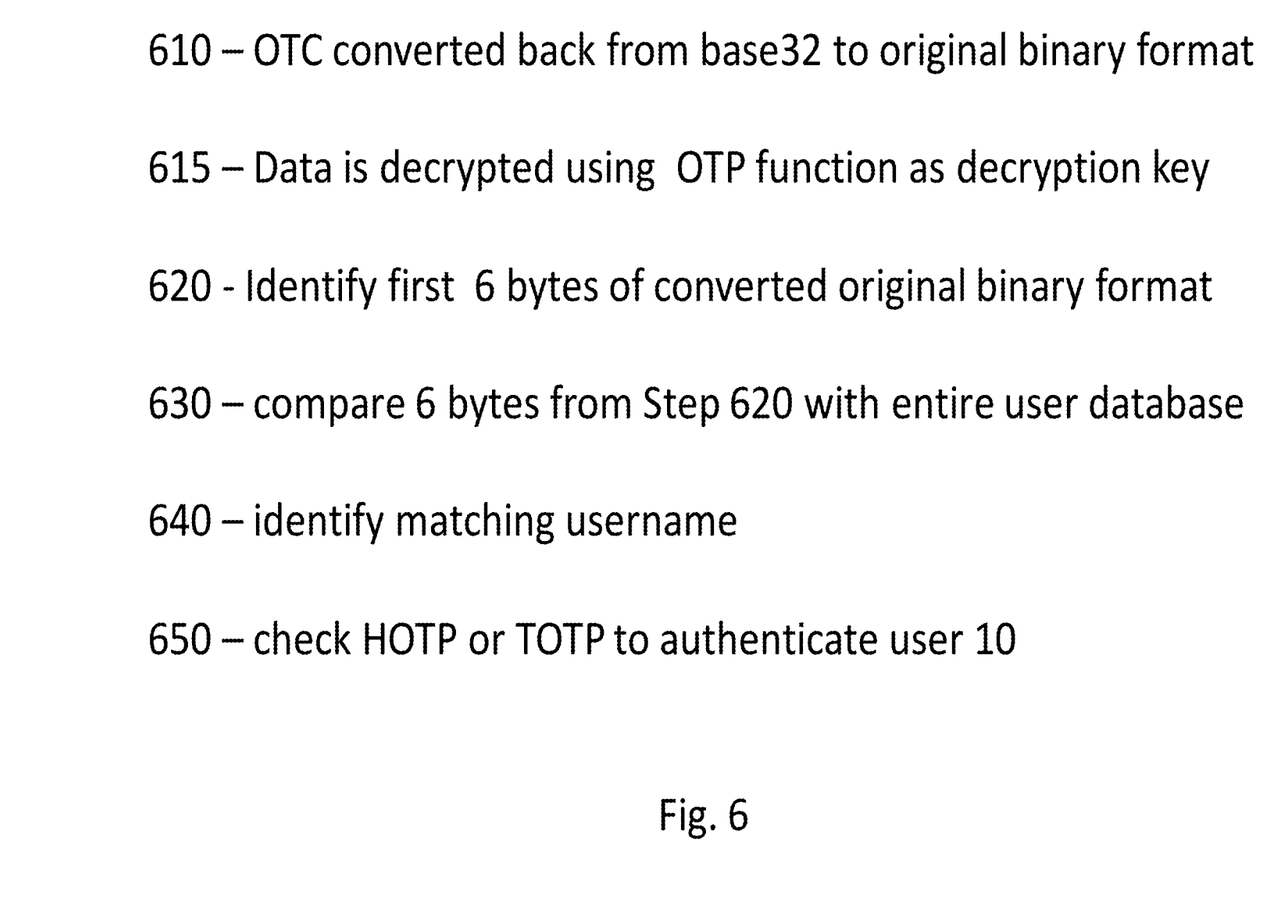
FIG. 6 shows the steps followed for authentication/verification of an OTC and username pursuant to a preferred embodiment of the present invention.

Referring now to FIG. 6, the authentication process within IAS 16 proceeds according to the preferred embodiment of the present invention in the following manner:

a. Step 610—the OTC received from portal 410 is converted from the base32 format to the original binary format.
b. Step 615—Data is decrypted using the result of the customerOTPlong function (documented above in the pseudo-code) as a decryption key.
c. Step 620—IAS 16 extracts the first N characters or bytes from the binary form of the OTC. In the preferred embodiment of the present invention, N is 6 bytes. These first 6 bytes represent the userLink, which was originally utilized as described in the previous section "Generating the OTC."
d. Step 630—the converted 6 bytes (representing the userLink) from step 620 are compared to equivalent userLink codes of all entries in the entire table that links all values of userLink to each user object in the user database. Generally, this comparison will result in only 1 user match. If, though, more than 1 user profile is identified, the conflict is easily resolved, as only one of the matching profiles will also have a matching HOTP/TOTP part.
e. Step 640—IAS 16 identifies the matching user profile.
f. Step 650—IAS 16 checks the HOTP or TOTP of the received OTC to authenticate the user who has matched in step 630 and step 640 to validate the user as an authentic user based upon the HOTP or TOTP.

There is a possibility that steps 630 and 640 result in multiple matches from the userLink database. In this case, the HOTP or TOTP of the received OTC is checked. Comparing the HOTP or TOTP of the received OTC to that/those of the multiple matches will identify a single userLink match since only one of the userLinks in the database can and will match with the HOTP or TOTP presented with the OTC. When multiple matches occur and the HOTP or TOTP is checked, the result is not only the selection of the correct userLink match, the userLink of user 10 is authenticated/validated at the same time.

One skilled in the art will recognize that the comparison described in step 630 could be a daunting task as potentially millions of entries must be checked. In the preferred embodiment a hash table or Aho-Korasic table is utilized to make the comparison process proceed quickly. Use of either of these tables is not exclusive to practicing the present invention and any method of comparison is contemplated herein.

Overall System

Figure 7:
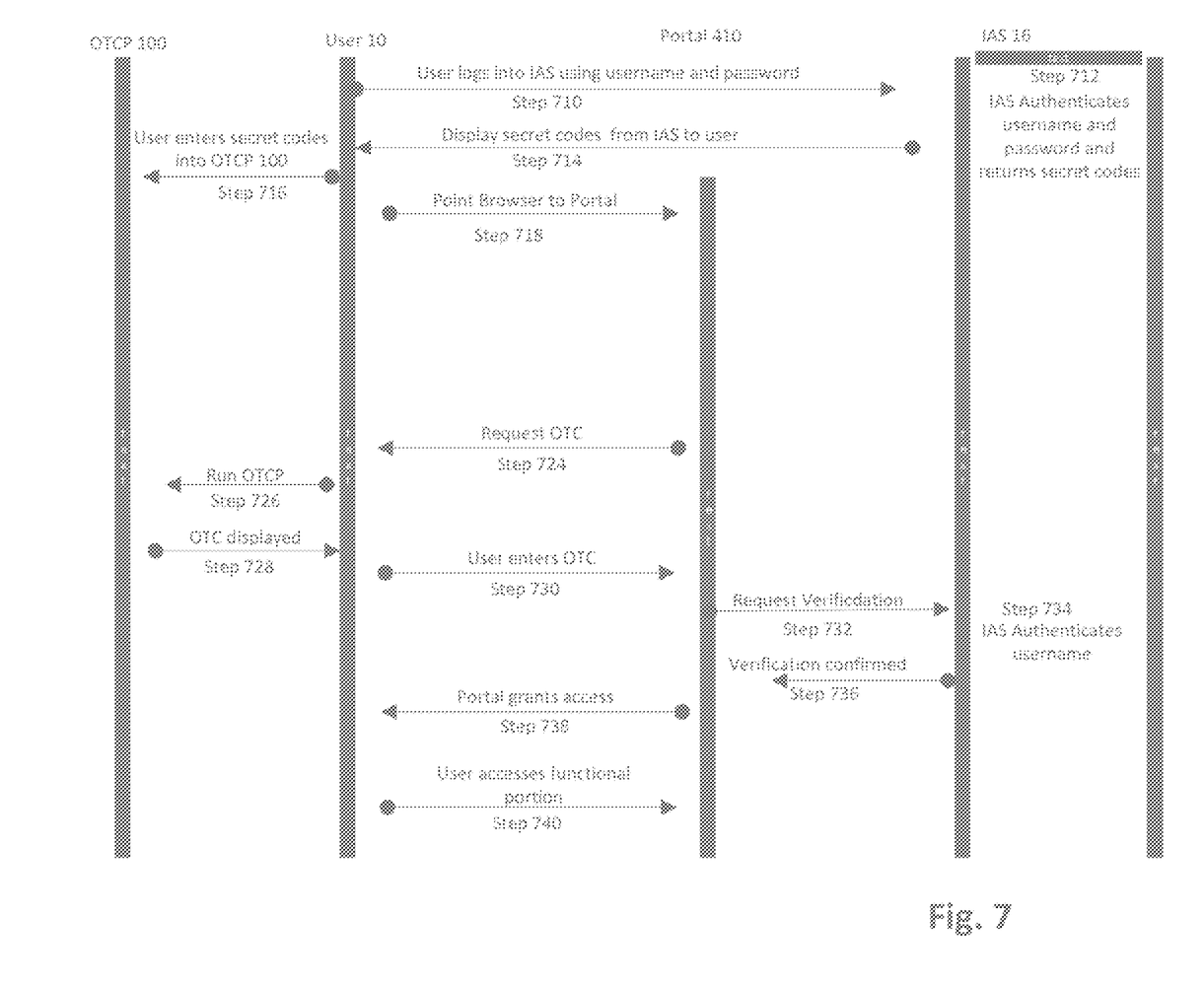
FIG. 7 illustrates a flow diagram for a process a user will follow in accessing web applications and services that are secured pursuant to a preferred embodiment of the present invention.
Figure 8:
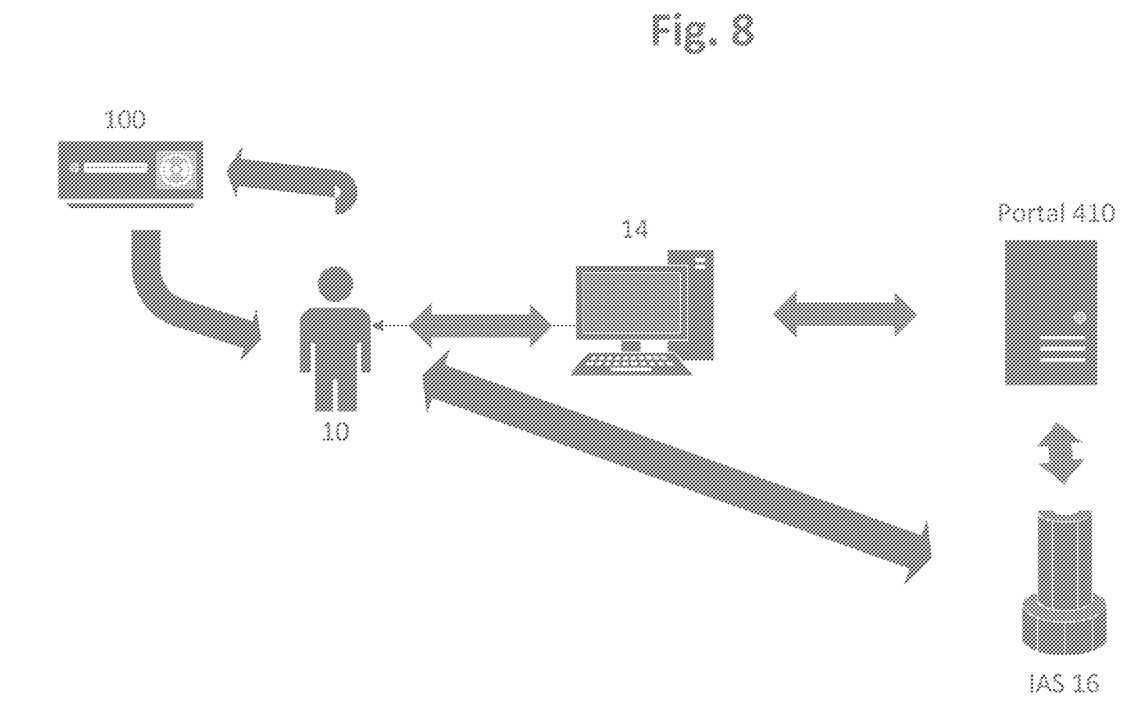
FIG. 8 illustrates an example of a system of the process of FIG. 7 pursuant to a preferred embodiment of the present invention.

Reference is now made to FIGS. 7 and 8. FIGS. 7 and 8 illustrate the overall process user 10 will follow in accessing web applications and services that are secured using the methods of a preferred embodiment of the present invention.

Pursuant to a preferred embodiment of the present invention and referring to FIG. 7 in conjunction with FIG. 8, user 10 inputs user 10's username and password and/or other login credentials to IAS 16 (step 710) to begin initialization of user 10's OTCP 100 (this assumes that OTCP 100 has not yet been initialized). In the preferred embodiment user 10 inputs the username and password to IAS 16 directly through computing device 14. Other means of inputting the login credentials may be utilized, but such means of inputting should be secure. In step 712, IAS 16 receives the username and password or login credentials and authenticates these utilizing conventional methods and generates at least one secret code as described above in Initialization.

The five secret codes, according to a preferred embodiment of the present invention, generated by IAS 16 in step 712 are:

a. A secret userLink, totally random for each user;
b. A secret userSeed, totally random for each user;
c. A secret groupSeed, totally random and the same for all users who belong to a specific defined group (but distinct and unique for each group).
d. A secret groupPSK, totally random and the same for all users who belong to a specific defined group (but distinct and unique for each group).
e. A secret groupShift a numerical value totally random and the same for all users who belong to a specific defined group (but distinct and unique for each group).

These secrets codes are stored on IAS 16, and hereafter will collectively be identified as "secret codes". In particular, the userLink is the only way the IAS 16 will be able in the future to recognize which user profile is attempting to authenticate; this userLink may or may not be generated starting from the user's username, but it always has to be stored together with an association to a specific user profile for the IAS 16 to look up the user profile in the future. This association may be done by storing any other unique user profile information "coupled" or associated with the secret userLink code. Examples of valid associations between the userLink and user profile include:

userLink—username of the user profile
userLink—GUID (globally unique identifier) of the user profile.

These two associations are listed just for exemplary reasons and are not all the possible unique value couples.

At step 714 the secret codes are transmitted and displayed to user 10 and at step 716 the user 10 inputs the secret codes into OTCP 100 of token 12.

As mentioned, pursuant to a preferred embodiment of the present invention, and as shown in FIG. 8, token 12, or OTCP 100, is activated, or in other words initialized, by user 10 in step 716 and as further described above in Initialization and with regards to FIG. 2 and the step diagram of FIG. 3.

The initialization of OTCP 100, or initialization phase, occurs only once for OTCP 100. As described above, each separate token 12 running OTCP 100 will be initialized pursuant to the above described method. Therefore, if user 10 buys a new phone, upgrades a tablet, or otherwise obtains a new device upon which OTCP 100 operates, user 10 will initialize OTCP 100 on that particular device. The initialization phase takes place for OTCP 100 to generate the OTCs.

The secret codes are discussed at length in the Initialization section above.

As outlined in the Initialization section, inputting the secret codes into OTCP 100 (step 716) can be done manually, but this method is not convenient and subject to human error during the input process. As described above in the Initialization section, in the preferred embodiment IAS 16 sends to computing device 14 a QR code which displays the QR code (Quick Response code which is a 2-dimensional/matrix bar code, machine-readable optical label). User 10 then causes OTCP 100, or token 12 running OTCP 100, to scan the QR code displayed by computing device 14. OTCP 100 automatically reads the secret codes contained in the information of the QR code and securely stores, and encrypts, the information in token 12 running the OTCP 100 for future use. Any means of inputting the secret codes into token 12 running OTCP 100 may be utilized in the practice of the present invention as described in the Initialization phase above.

As mentioned above, this initialization phase is required only once for each OTCP 100 device. Obviously, if token 12 and OTCP 100 is erased or other reasons require the re-installation of OTCP 100 and its accompanying information then the initialization phase would of necessity need to be redone. Otherwise, user 10 will not need to input user 10's username and/or password or other login credentials again for authentication with IAS 16 when utilizing an OTCP 100 device that has already been initialized. Each separate device running OTCP 100 requires the one-time method of the initialization phase.

Once user 10 has caused token 12 running OTCP 100 to store the secret codes generated by IAS 16 as explained above, user 10 may authenticate with IAS 16 using OTC's generated by OTCP 100 without inputting user 10's username and password or other login credentials.

With the secret codes stored in the computing token 12 running OTCP 100, user 10 is now able to access the apps and resources of portal 410.

Pursuant to the preferred embodiment of the present invention, user 10 points a client software (typically a web browser running in computing device 14, but this could actually be any client app/program) to portal 410 (step 718). It is assumed that user 10 requires authentication to access the functional portions of portal 410 and, for the current example, that portal 410 requires an OTC pursuant to the present invention for authentication. Accordingly, portal 410 requests an OTC from user 10 (step 724). User 10 then runs OTCP 100 at step 726. OTCP 100 then generates an OTC pursuant to the method described in Generating the OTC, and displays in token 12 the OTC at step 728. User 10 then inputs, preferably manually but other methods may be utilized such as scanning a QR code generated by token 12, the OTC into the web browser which is transmitted to portal 410 (step 730). The OTC is the only login information supplied by user 10 to portal 410. User 10 does not supply to portal 10 a username, password, PIN or other login credentials, only the OTC.

Upon receipt by portal 410 of the OTC from user 10, portal 410 transmits a request, including the OTC just received from user 10, to IAS 16 requesting verification (step 732). It should be understood that user 10 does not input user 10's username and password or other login credentials of user 10. Only the OTC is input for verification with IAS 16 and the OTC does not contain user 10's username, password or other login credentials.

IAS 16 authenticates user 10's request for access to portal 410's apps or resources by analyzing the OTC transmitted from portal 410 (step 734) using the authentication method outlined above in the section Validation by IAS 16. Upon authentication by IAS 16 of the OTC, IAS 16 transmits back to portal 410 authorization for user 10 to access portal 410's functional portion (step 736). Portal 410 then grants access to user 10 (step 738) and in step 740 user 10 accesses portal 410's functional portion and/or resources.

Certain processes described throughout the various descriptions above can be stored in software and/or on a chip such as the operation of OTCP 100, authentication of user 10 by IAS 16, and/or generation of the secret code(s) by IAS 16.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned Detailed Description, the descriptions and illustrations of the preferred embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A computer network-accessible identity and authentication service (IAS) for authenticating a user for a third party, the computer-implemented IAS comprising:
a code generation component configured to generate one or more user codes for an enrolling user of the IAS, wherein a first user code of the one or more user codes being a unique identifier to the IAS for the user, and each of the one or more user codes are unique identifiers associated with the enrolling user;
an enrollment component that enrolls the enrolling user with the IAS, wherein the enrollment component:
generates one or more user codes for an enrolling user via the code generation component; and
obtains username and password credentials from the enrolling user and maintains the obtained username and password credentials in association with the one or more user codes for the enrolling user; and
provides the one or more user codes of the enrolling user to a one-time code program (OTCP) executing on a computing device associated with the enrolling user; and
an authentication component, wherein the authentication component:
receives a request over a computer network from a third-party service for authentication of a requesting user, wherein the request includes encoded data for identifying and authenticating the requesting user, and wherein the encoded data does not include a username or password;
extracts at least a first user code from the encoded data;
determines login credentials of the requesting user as associated with the at least a first user code;
determines whether the requesting user is authorized to access restricted content of the third-party service according to the login credentials of the requesting user as associated with the at least a first user code; and
returns a validity indication to the third-party service based on the determination of whether the requesting user is authorized to access restricted content of the third party.

2. The computer network-accessible identity and authentication service of claim 1, wherein the encoded data comprises a one-time code (OTC) generated by the OTCP of the enrolling user.

3. The computer network-accessible identity and authentication service of claim 1, wherein the OTC is encoded as a hash-based message authentication code (HMAC) one-time password (HOTP).

4. The computer network-accessible identity and authentication service of claim 1, wherein the OTC is encoded as a time-based one-time password (TOTP).

5. The computer network-accessible identity and authentication service of claim 1, wherein the OTC is encoded with a Base32 encoding.

6. The computer network-accessible identity and authentication service of claim 1, wherein the OTC is encoded with a sha256 encoding.

7. The computer network-accessible identity and authentication service of claim 1, wherein the OTC was generated by the OTCP according to the one or more codes according to at least one of the one or more user codes provided to the OTCP during enrollment with the IAS.

8. A computer-implemented method of an identity and authentication service (IAS) for providing user authentication of a user to a third-party service, the method comprising:
enrolling at least a first user with the IAS, comprising:
generating a plurality of user codes for the first user, wherein each of the plurality of user codes is a unique identifier for the first user;
maintaining user authentication credentials of the first user for the third-party service in association with the plurality of user codes for the first user; and
providing the plurality of user codes for the first user to a one-time code program (OTCP) executing on a computing device associated with the first user; and
subsequent to enrolling the first user with the IAS, and for each request from the third-party service to authenticate a requesting user:
obtaining encoded data for identifying and authenticating the requesting user, wherein the encoded data does not include a username or password of the first user;
extracting a first user code from the encoded data;
determining whether the first user code corresponds to the first user;
upon a determination that the first user code corresponds to the first user, determining that the login credentials of the first user allow the first user access to the third-party service; and
upon a determination that the login credentials of the first user allow the first user access to the third-party service, returning a validity indication to the third-party service.

9. The computer-implemented method of claim 8, wherein the encoded data comprises a one-time code (OTC) generated by the OTCP of the requesting user.

10. The computer-implemented method of claim 8, wherein the OTC is encoded as a hash-based message authentication code (HMAC) one-time password (HOTP).

11. The computer-implemented method of claim 8, wherein the OTC is encoded as a time-based one-time password (TOTP).

12. The computer-implemented method of claim 8, wherein the OTC is encoded with a Base32 encoding.

13. The computer-implemented method of claim 8, wherein the OTC is encoded with a sha256 encoding.

14. The computer-implemented method of claim 8, wherein the OTC was generated by the OTCP according to the one or more codes according to at least one of the one or more user codes provided to the OTCP during enrollment with the IAS.

* * * * *